United States Patent
Tanis et al.

(10) Patent No.: US 6,325,714 B1
(45) Date of Patent: Dec. 4, 2001

(54) ROTOR ASSEMBLY FOR A COMBINE

(75) Inventors: Dale R. Tanis, Geneseo; Jonathan E. Ricketts, Viola, both of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/413,938

(22) Filed: Oct. 7, 1999

(51) Int. Cl.$^7$ .................................................. A01F 12/18
(52) U.S. Cl. ................................................ 460/71; 460/72
(58) Field of Search .............................. 460/71, 72, 119, 460/110, 122

(56) References Cited

U.S. PATENT DOCUMENTS

| | | |
|---|---|---|
| 4,362,168 | 12/1982 | Hengen et al. . |
| 4,889,517 | 12/1989 | Strong et al. . |
| 4,936,810 | 6/1990 | Strong et al. . |
| 4,946,419 | 8/1990 | Cromheecke et al. . |
| 5,035,675 | 7/1991 | Dunn et al. . |
| 5,125,871 | 6/1992 | Gorden . |
| 5,192,245 | 3/1993 | Francis et al. . |
| 5,192,246 | 3/1993 | Francis et al. . |
| 5,376,047 | 12/1994 | Harden et al. . |
| 5,413,531 | 5/1995 | Tanis . |

Primary Examiner—Thomas B. Will
Assistant Examiner—Nathan Mammen
(74) Attorney, Agent, or Firm—Richard G. Lione; Brinks Hofer Gilson & Lione

(57) ABSTRACT

A rotor assembly for an agricultural combine includes a rotor, a plurality of short thresher elements and a plurality of elongated thresher elements. The short thresher elements and a plurality of elongated thresher elements are arranged on the rotor so that the crop material contacts at least two short thresher elements before contacting an elongated element, thereby breaking up clumps of crop material before the clumps contact an elongated element. The agricultural combine has a rotor having a front portion, a rear portion a plurality of elongated thresher elements. Each elongated thresher element is aligned along a separate longitudinal line which extends from the front portion to the rear portion, to prevent a roll of material from building across multiple elongated thresher elements.

5 Claims, 5 Drawing Sheets

ROTOR ASSEMBLY FOR A COMBINE

FIELD OF THE INVENTION

This invention relates generally to a rotor assembly for an agricultural combine. It relates particularly to the construction and arrangement of thresher elements on a rotor for threshing and separating crop material that is fed into the rotor assembly.

BACKGROUND OF THE INVENTION

A conventional agricultural combine generally includes a header mechanism that severs and collects crop material as the combine is driven through a field, and a feeder mechanism that feeds the crop material to a threshing mechanism in the combine. The threshing mechanism includes a rotor assembly. The crop material is threshed as it passes between a rotor and a cylindrical housing of the rotor assembly.

Typically, the rotor has a front portion, a rear portion and an outer surface that is proximate the cylindrical housing. Generally, a number of thresher elements are secured to the outer surface. As the rotor rotates, crop material enters the rotor assembly and the thresher elements facilitate the flow of the crop material towards the rear portion and separate the seeds from the remaining plant material.

The thresher elements typically include both short elements and elongated thresher elements which are arranged in particular patterns or arrays to form helical paths. The crop material flows along these helical paths. Typically, the thresher elements are arranged so that the crop material will strike one short thresher element and then proceed to impact an elongated thresher element. Further, in a conventional rotor assembly two elongated thresher elements may be secured so that they lie along a common line parallel to the longitudinal axis of the rotor.

Crop material sometimes has a tendency to form clumps against elongated thresher elements. In addition, in the configuration where two elongated thresher elements are arranged along the same line, a roll of crop material may form against the multiple elongated thresher elements. Such clumping and formation of rolls can affect the capacity of the rotor assembly. Further, when the rotor encounters clumps or rolls of material, increased horsepower may be required to maintain a normal threshing operation. This increased horsepower requirement can result in a torque spike in the rotor, which generally tends to decrease the effective life of the rotor and, possibly, of the rotor drive.

BRIEF SUMMARY OF THE INVENTION

It is an object of the present invention to provide an improved rotor assembly that overcomes the disadvantages described above and prevents clumps or rolls of material from forming along elongated threshing elements during the course of a threshing operation.

In one aspect of the invention, the rotor assembly includes a rotor and a plurality of short thresher elements and elongated thresher elements that are arranged on the rotor so that the crop material contacts at least two short thresher elements before contacting an elongated thresher element. As a result, clumps of crop material are broken up before they contact an elongated element.

In another aspect of the invention, a rotor assembly for an agricultural combine includes a rotor having a front portion, a rear portion, and a plurality of elongated thresher elements. Each elongated thresher element is aligned along a separate longitudinal line which extends from the front portion to the rear portion, to prevent a band of material from building across multiple elongated thresher elements.

The invention includes the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF THE INVENTION

Figure 1:
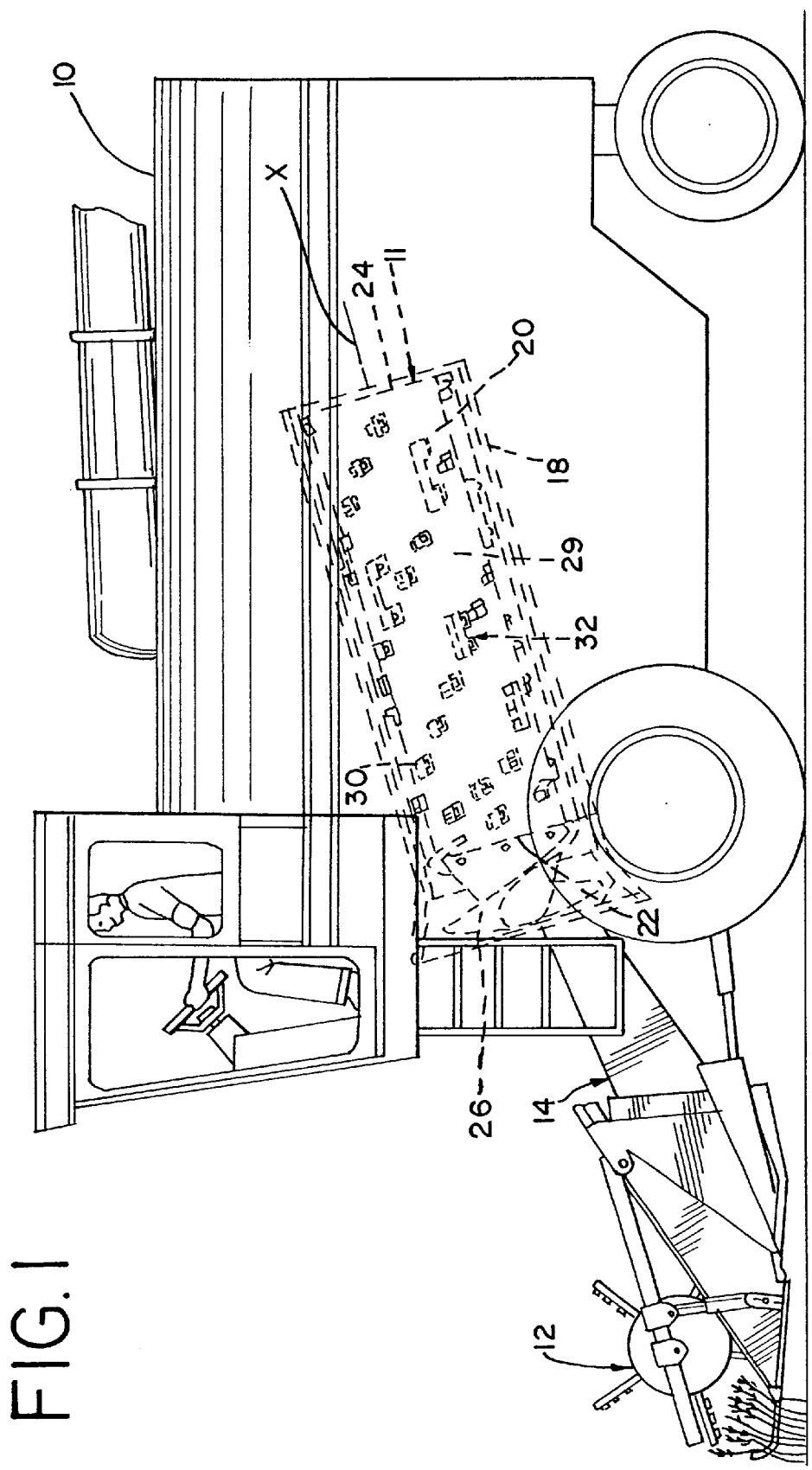
FIG. 1 is a schematic view of an agricultural combine showing the general location of a rotor assembly.

Referring to FIG. 1, a self-propelled combine 10 incorporates a preferred embodiment of the rotor assembly 11. The combine 10 also includes a head assembly 12 for severing and gathering crop materials, and a feeder mechanism 14 for elevating and advancing crop material towards a threshing mechanism in the combine.

The threshing mechanism of the combine 10 is comprised of the rotor assembly 11, which includes a rotor 20 mounted for rotation about an inclined, longitudinal axis X. The rotor 20 is disposed within a stationary cylindrical housing 18 that is provided with a conventional "concave and grate" configuration. The rotor 20 has a front portion 22, a rear portion 24 and an outer surface 29. Impeller blades 26 are attached to the front portion.

Figure 2:
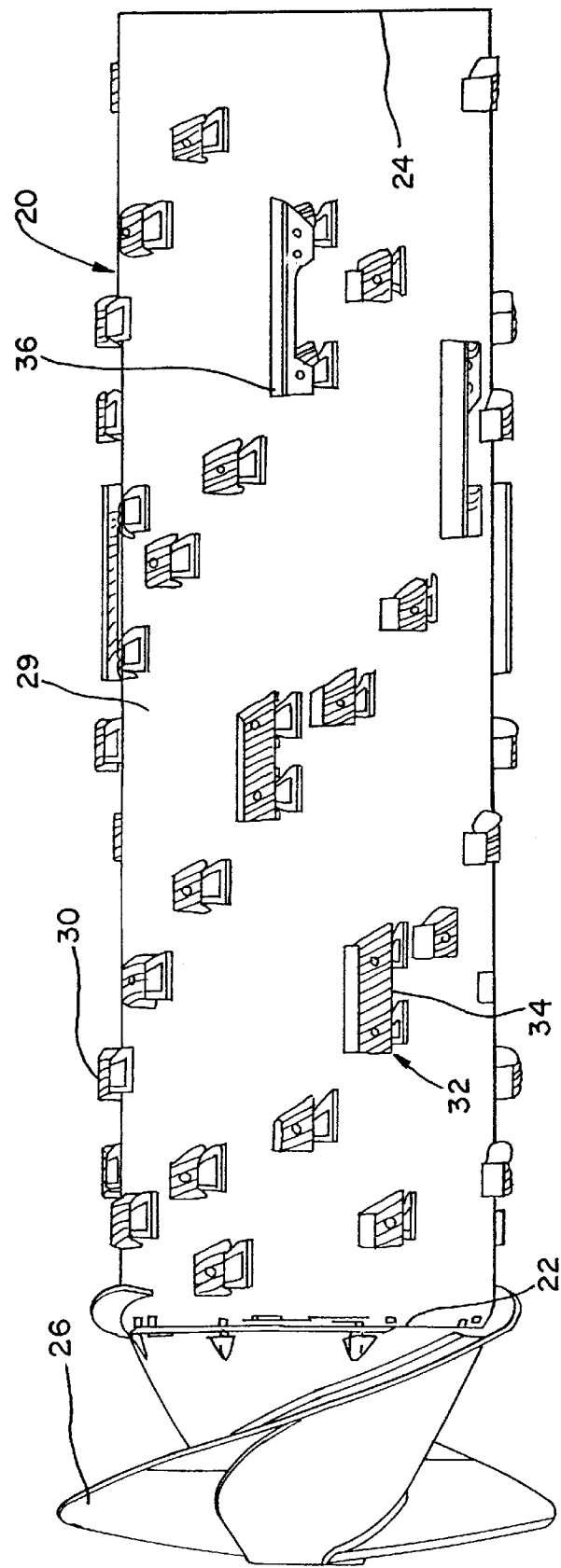
FIG. 2 is a side elevational view of the rotor assembly shown in FIG. 1.
Figure 3:
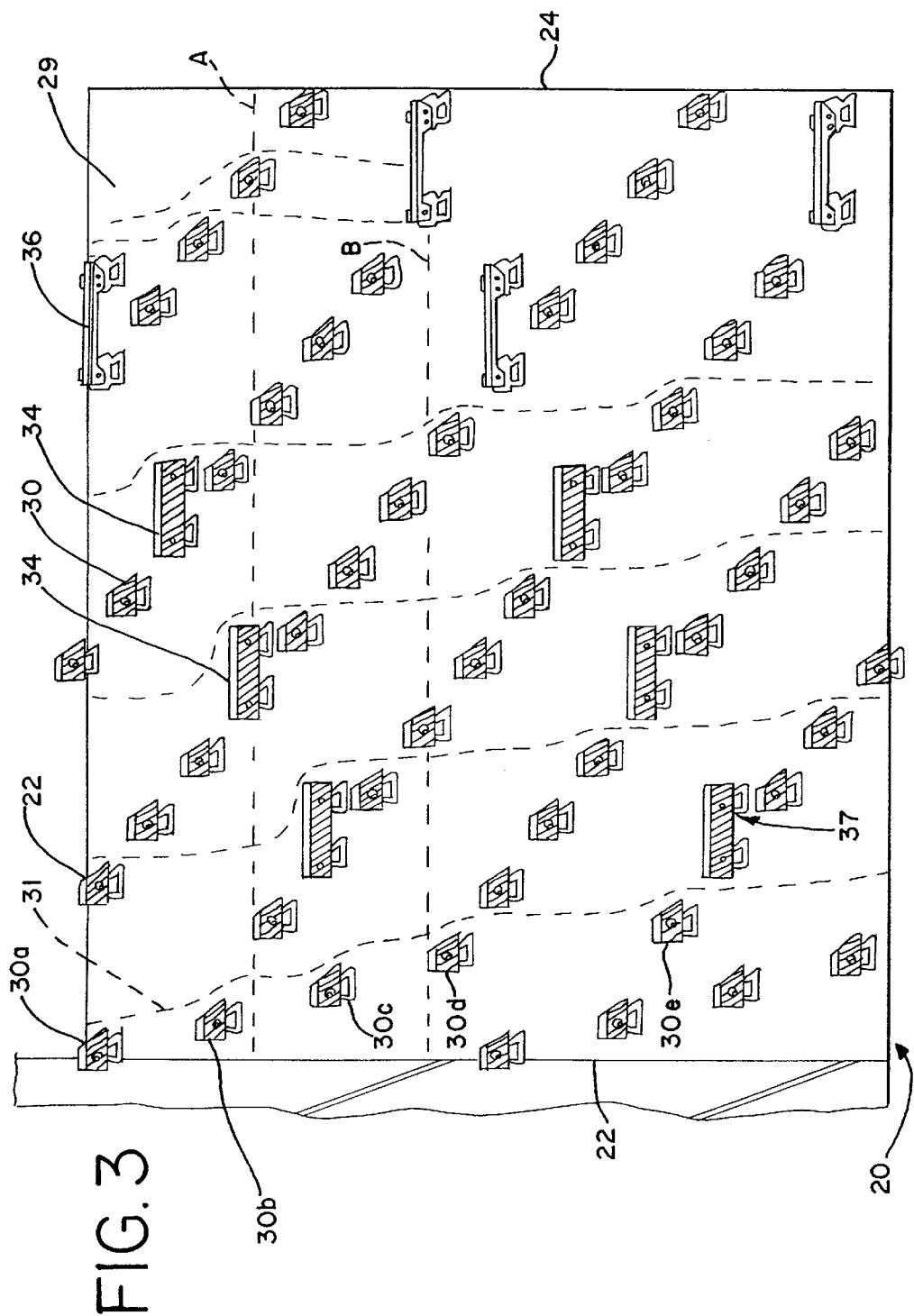
FIG. 3 is a schematic representation of an outer surface of the rotor assembly shown in FIG. 2.

Referring to FIGS. 1–3, the rotor 20 includes at least two short thresher elements 30 and at least one elongated thresher element 32 fixed to the outer surface 29, and preferably includes a plurality of short thresher elements 30 and elongated thresher elements 32. These short thresher elements 30 and elongated thresher elements 32 are arranged on the outer surface 29 of the rotor 20 in a manner that serves to reduce the likelihood that crop material flowing along the rotor 20 will form clumps against a particular elongated threshing element 32. These short thresher elements 30 and elongated thresher elements 32 are also arranged on the outer surface 29 of the rotor 20 in a manner that prevents rolls of crop material from forming along multiple elongated thresher elements 32.

Figure 4:
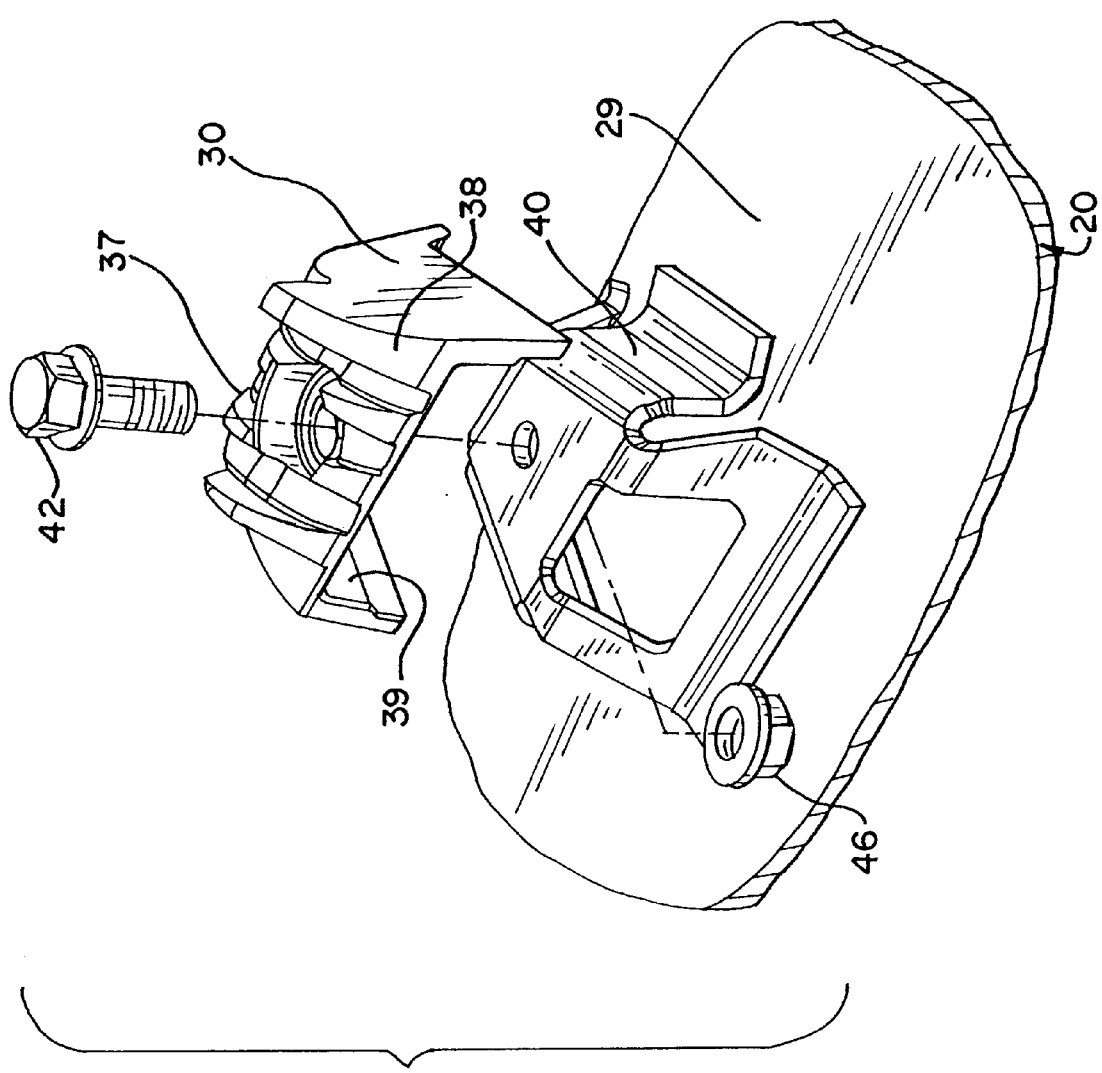
FIG. 4 is an exploded perspective view of a short thresher element and a mounting lug.

Referring to FIG. 4, in the preferred embodiment the short thresher elements 30 are comprised of short rasp bars. As shown in FIG. 2, the elongated thresher elements 32 are comprised of elongated or straight rasp bars 34 and elongated or straight separator bars 36.

As shown in FIG. 2, in a preferred embodiment the short rasp bars 30, straight rasp bars 34 and straight separator bars 36 are arranged so that they define a plurality of generally helical shaped paths along the outer surface 29 of the rotor 20. Referring to FIG. 3, the dashed lines 31 that are generally vertical in direction (as viewed from FIG. 3) illustrate the general path of crop material flowing along the outer surface 29 of rotor 20. The short rasp bars 30, straight rasp bars 34 and straight separator bars 36 are arranged as shown on the outer surface 29 of the rotor 20 so that the crop material will impact against at least two short rasp bars 30 before making contact with either a straight rasp bar 34 or a straight separator bar 36.

Referring again to FIG. 3, the elongated threshing elements 32 are arranged so that each elongated threshing element 32 is aligned along a longitudinal line that extends from the front portion 22 to the rear portion 24 of the rotor 20. As an example, two such longitudinal axes A and B are illustrated in FIG. 3 by the dashed lines that are drawn horizontally. In a preferred embodiment, the elongated threshing elements 32 are arranged on the outer surface 29 of the rotor 20 so that each straight rasp bar 34 is aligned along its own separate lines line A and each straight separator bar 36 is aligned along its own separate longitudinal line B.

Referring to FIG. 4, in the illustrated embodiment, the short rasp bar 30 has a spike 38 projecting from a top surface 37. The spike 38 is especially useful in threshing crops such as rice and other crops having particularly tough straw. Descriptions and examples of spiked rasp bars and alternative types of rasp bars that could be fixed to the rotor 20 and used in the present invention are disclosed in U.S. Pat. Nos. 5,192,245; 5,192,246 and 5,035,675, the entire disclosures of which are incorporated herein by reference. All of one type of short rasp bar 30, such as a rasp bar 30 having a spike, could be fixed to the rotor 20. Alternatively a combination of different types of short rasp bars 30 could be fixed to the rotor 20.

Figure 6:
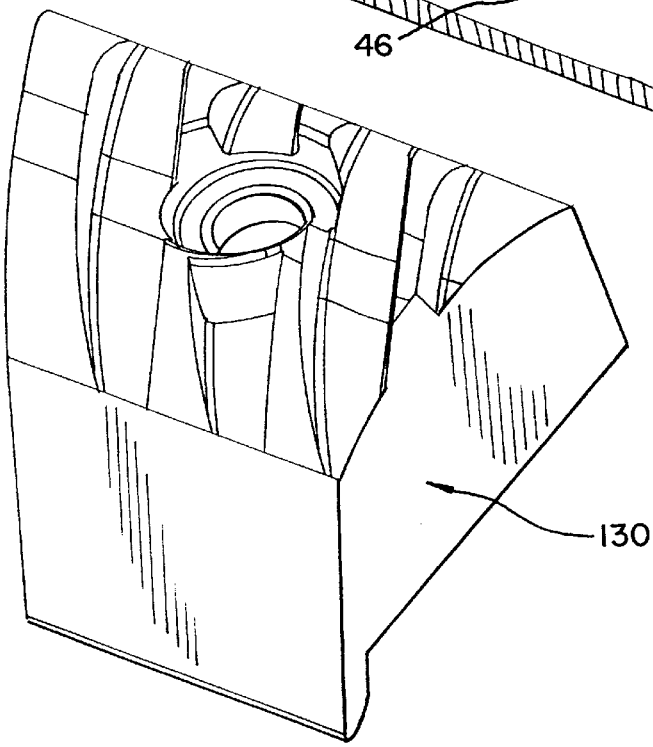
FIG. 6 is a perspective view of an alternative embodiment of a short thresher element for use with the present invention.

An example of an alternative type of short rasp bar 130 that can be used in the present invention is shown in FIG. 6. This rasp bar is especially useful in threshing crops such as corn, beans wheat, barley and oats.

In the illustrated embodiment, the elongated thresher elements 32 are either standard straight rasp bars 34 or standard straight separator bars 36 which are disclosed in U.S. Pat. Nos. 5,035,675 and 5,192,246. As shown in FIGS. 1 and 3, these elongated thresher elements 32 are preferably linearly aligned parallel to the axis C of rotation of the rotor 20. Alternatively, these thresher elements 32 may lie on helically defined paths.

Referring to FIG. 4, a short rasp bar 30 is shown fixed to the outer surface 29 of the rotor 20 using a mounting lug 40. The mounting lug 40 may be a standard mounting lug which is disclosed, for example, in U.S. Pat. No. 5,035,675. The mounting lug 40 is preferably welded to the outer surface of the rotor 20. An inner surface 39 of the rasp bar 30 is shaped to accommodate the mounting lug 40. As shown in FIG. 4, in a preferred embodiment, the rasp bar 30 is fixed to the lug 40 using a bolt 42 and a nut 46.

Figure 5:
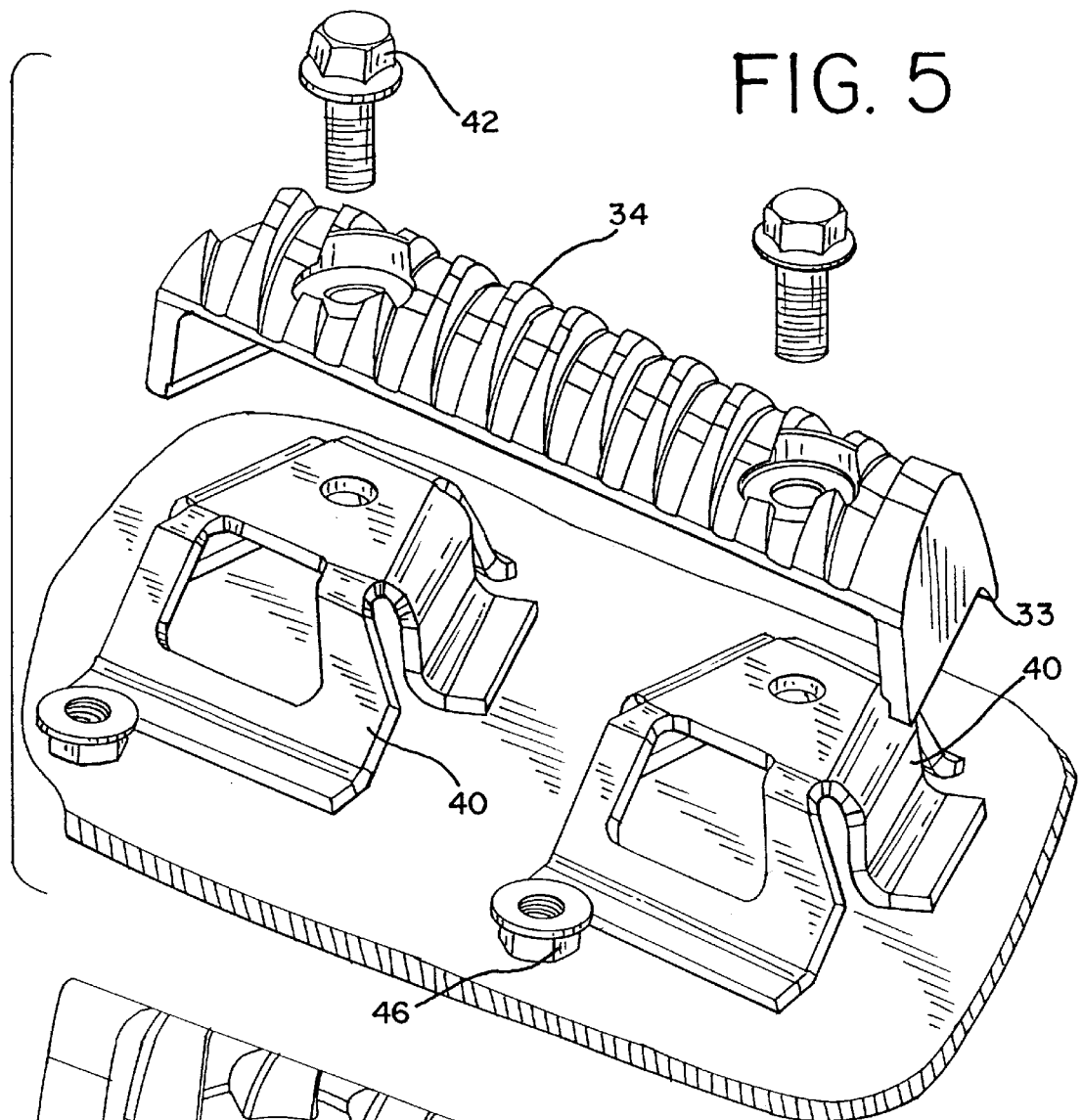
FIG. 5 is an exploded perspective view of an elongated thresher element and mounting lugs.

Referring to FIG. 5, a straight rasp bar 34 is fixed to the outer surface 29 of the rotor 20 using two mounting lugs 40. The mounting lugs 40 are preferably the standard mounting lugs which are disclosed in U.S. Pat. No. 5,035,675. An inner surface 33 of the straight rasp bar 34 is shaped to accommodate the mounting lugs 40. In a preferred embodiment the straight rasp bar 34 is fixed to the mounting lugs 40 using bolts 42 and nuts 46. The straight separator bars 36 shown in FIG. 3 may be the standard straight separator bars disclosed in U.S. Pat. Nos. 5,035,675 and 5,192,246 and may be attached to the outer surface 29 of the rotor 20 as described therein.

Referring to FIGS. 1–3, in operation, crop material is initially severed and conveyed to the feeder mechanism 14 by the header mechanism 12. The feeder mechanism 14, in turn, conveys the crop material to the rotor assembly 11. The crop material passes from the impeller blades 16 to the front portion of the rotor 22. From there, as shown in FIG. 2, the crop material flows along the helical paths defined by the short thresher elements 30 and the elongated thresher elements 32 toward the rear portion 24 of the rotor.

Referring to FIG. 3, in a preferred embodiment the crop material initially contacts a plurality of short rasp bars 30. The short rasp bars 30 act to thresh the crop material and push the crop material towards the rear portion 24. After contacting at least two short rasp bars 30 the crop material impacts on a straight rasp bar 34.

An advantage of the present invention is that the likelihood of substantial clumps of material contacting an elongated threshing element 32 is reduced because the crop material contacts at least two short rasp bars 30 before impacting on an elongated thresher element. This advantage reduces the horsepower needed to drive the rotor 20, since increased power is required when substantial clumps of material impact against elongated thresher elements 32. Further, the incidence of torque spikes in the rotor 20 is reduced, which prolongs the effective life of rotor 20. Additionally, this arrangement enhances the quality of threshing performed by the rotor assembly 11, as well as its capacity.

A further advantage is obtained by the present invention through the arrangement of the elongated threshing elements 32. As discussed above, in a preferred embodiment each elongated thresher element 32 is aligned along its own separate longitudinal line A, B. This arrangement of elongated thresher elements 32 prevents a roll of crop material from forming along multiple elongated thresher elements. The buildup of such rolls can require increased horsepower to the rotor 20 in order to continue the normal threshing process. Further, the formation of such rolls can cause torque spikes, which decreases the overall effective life of the rotor. In addition, this arrangement of the elongated thresher elements 32 provides a better quality of threshing by and an enhanced capacity for the rotor assembly 11.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A rotor assembly for an agricultural combine, comprising:
   a rotor having a front portion, a rear portion and a cylindrical outer surface disposed between the front portion and the rear portion, said rotor being rotatable about a longitudinal axis;
   a plurality of thresher elements secured with said outer surface, said plurality of thresher elements including short thresher elements and elongated thresher elements arranged in at least two generally parallel helical paths around said cylindrical outer surface;
   said plurality of thresher elements in each of said generally helical paths including a first short thresher element secured with the outer surface, a second short thresher element secured with the outer surface and an elongated thresher element secured with the outer surface;

rotation of said rotor causing crop material which is fed to said front portion to flow rearwardly toward said rear portion along a generally helical path and, as it flows in this path, to always contact the first short thresher element and the second short thresher element before contacting the elongated thresher element in either of said two generally parallel helical paths to break up clumps of crop material before the clumps reach an elongated thresher element.

2. The rotor assembly of claim 1, wherein the elongated thresher elements are aligned parallel to the direction of the axis of rotation of the rotor.

3. The rotor assembly of claim 1, wherein the elongated thresher elements comprise straight rasp bars for threshing crop material.

4. The rotor assembly of claim 1, wherein the thresher elements are all aligned parallel to the axis of rotation of the rotor.

5. The rotor assembly of claim 1, wherein each elongated thresher element is aligned along a separate longitudinal line extending parallel to the axis of rotation of the rotor.

* * * * *